(12) United States Patent
Eccles

(10) Patent No.: US 6,445,506 B1
(45) Date of Patent: Sep. 3, 2002

(54) HEAD UP DISPLAY SYSTEM

(75) Inventor: Lee Vernon Eccles, Rhyl (GB)

(73) Assignee: Pilkington PE Limited (GB)

(*) Notice: Subject to any disclaimer, the term of this patent is extended or adjusted under 35 U.S.C. 154(b) by 0 days.

(21) Appl. No.: 09/743,937

(22) PCT Filed: Sep. 8, 1999

(86) PCT No.: PCT/GB99/02980

§ 371 (c)(1),
(2), (4) Date: Jan. 17, 2001

(87) PCT Pub. No.: WO00/17696

PCT Pub. Date: Mar. 30, 2000

(30) Foreign Application Priority Data

Sep. 17, 1998 (GB) .............................. 9820179

(51) Int. Cl.$^7$ .............................. G02B 27/14
(52) U.S. Cl. ........................ 359/631; 359/632
(58) Field of Search ............... 359/630, 631, 359/632

(56) References Cited

U.S. PATENT DOCUMENTS

| 3,170,979 A | * | 2/1965 | Baldwin et al. ............. 359/632 |
| 4,364,636 A | * | 12/1982 | Ellis ........................... 359/632 |
| 5,543,968 A | * | 8/1996 | Freemen et al. ............ 359/631 |
| 5,553,328 A | | 9/1996 | Hall et al. ..................... 2/422 |
| 5,581,806 A | | 12/1996 | Capdepuy et al. ............... 2/6.2 |
| 6,301,053 B1 | * | 10/2001 | Cheesman ................... 359/632 |

FOREIGN PATENT DOCUMENTS

| EP | 0 104 987 A2 | 4/1984 |
| EP | 0 572 284 A2 | 12/1993 |
| GB | 2 062 285 A | 5/1981 |
| GB | 2 174 213 A | 10/1986 |

* cited by examiner

Primary Examiner—Ricky Mack
(74) Attorney, Agent, or Firm—Alston & Bird LLP

(57) ABSTRACT

A head-up display system (10) incorporates a combiner (16) which is movable to a stowed (i.e., out-of-use) position by rotation about an axis (C) in or parallel to the plane of image projection.

7 Claims, 3 Drawing Sheets

HEAD UP DISPLAY SYSTEM

FIELD OF THE INVENTION

The present invention relates to head up display systems comprising a combiner and a projection unit such as used in aircraft, and more specifically to movement and stowage of the combiner of such a system.

BACKGROUND OF THE INVENTION

A head up display (HUD) system is used in vehicles such as aeroplanes in order to overlay the user's natural view (through, for example, a windscreen) with additional images in such a way that the natural view is not obstructed or obscured by the additional images.

Current HUD systems comprise a projection system mounted in the vehicle, generally above and out of sight of the user, projecting an image display from a projection unit onto a combiner, the direction of projection being substantially forward. The combiner, in use, is located in a deployed position which traverses the user's line of sight in such a way that the projected image is reflected from the combiner to the user's eyes. Light from an external field of view, meanwhile, passes through the combiner on the way to the user's eyes.

In this way, it appears to the user that the external view is overlaid with the image which is projected from the HUD system.

When not in use, the combiner is usually moved from the deployed position to a stowed position, out of the user's line of sight, in order to give the user as full an external field of view as possible. Current HUD systems, if they allow the combiner to be moved, enable movement of the combiner about a generally horizontal transverse axis towards and away from the projection unit. The presence of the projection unit prevents movement of the combiner completely outside the user's field of view. Thus, some obstruction of the user's normal field of view will still remain even with the combiner in the stowed position. Additionally, the stowed combiner will limit the freedom of movement of the user's head, as well as presenting a possible hazard in the event of a crash.

It is among the objects of embodiments of the present invention to alleviate or obviate these and other disadvantages of the existing HUD system.

BRIEF SUMMARY OF THE INVENTION

According to the present invention, there is provided a head up display system comprising a projection unit and a combiner wherein the projection unit projects an image onto the combiner, when the combiner is located in a deployed position, for reflection of the image towards the eye position of a user, the direction of image projection together with the direction of image reflection generally defining a projection plane;

the combiner being mounted rotatably on the projection unit such that the combiner may be reversibly moved between said deployed position and a stowed position in which said reflection does not occur;

the rotatable mounting taking the form of a pivot having an axis lying substantially in or parallel to the projection plane.

Preferably, the stowed position of the combiner is laterally offset from the body of the projection unit.

Preferably also the stowed position of the combiner is above the level of the lower surface of the projection unit.

Preferably the pivot is mounted on one side of the combiner and the projection unit.

Preferably the pivot comprises a sleeve surrounding a rod, the rod lying along the axis of rotation of the pivot.

Preferably also, one of said sleeve and rod is fixed in position, and the other of said sleeve and rod is rotatable and fixed to the combiner, such that rotation of said other of sleeve and rod causes rotation of said combiner about the axis of rotation of said pivot.

Preferably the head up display system further comprises mechanical stops which define the stowed and deployed positions of the combiner.

Preferably the head up display system further comprises a motor and gear arrangement to control movement of the combiner between the deployed and stowed positions.

Preferably also the motor and gear arrangement comprises a gearwheel secured to the pivot, such that rotation of the gearwheel results in rotation of the pivot.

Preferably also the gearwheel is further linked to a motor by means of a series of intermediate gear wheels and axles, which transmit movement of the motor to the gearwheel secured to the pivot.

Preferably the motor is mounted on the exterior of the projection unit.

BRIEF DESCRIPTION OF THE SEVERAL VIEWS OF THE DRAWINGS

One embodiment of the present invention will now be described, by way of example only, with reference to the accompanying figures, in which.

DETAILED DESCRIPTION OF PREFERRED EMBODIMENTS

Figure 1:
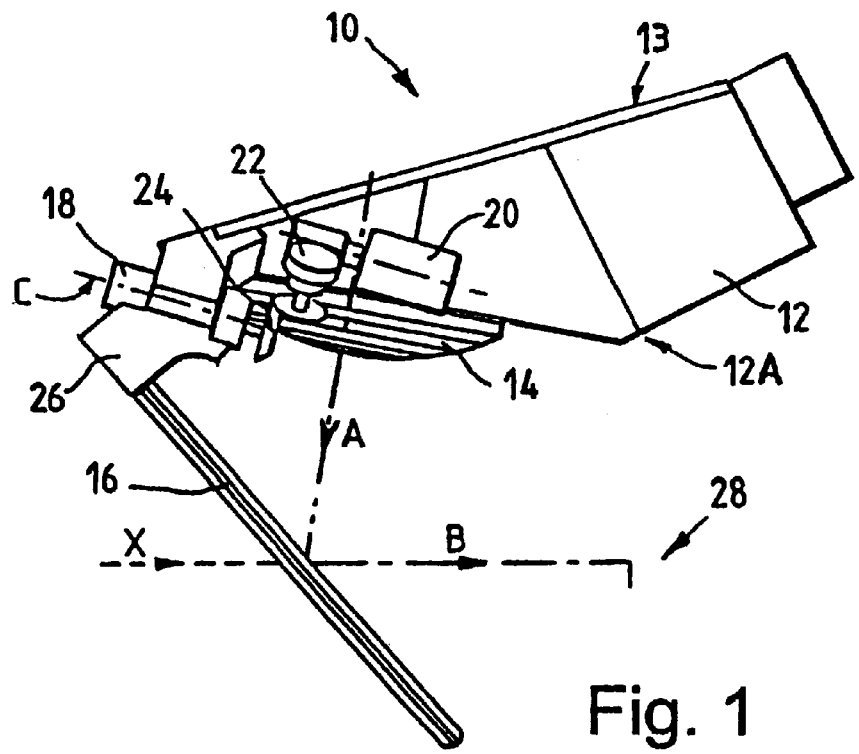
FIG. 1 shows a side view of a head up display system in accordance with an embodiment of the present invention, with the combiner unit in the deployed position.

As is shown in FIGS. 1 to 5, a head up display system 10 comprises a projection unit 12 with an exit lens 14, and a combiner 16 mounted on a combiner support bracket 26, which is connected to the projection unit 12 via pivot 18. A motor 20 is mounted on projection unit 12, and is connected via a series of gearwheels 22 to a gearwheel 24 fixed to pivot 18. The projection unit 12 is adapted to be mounted along its uppermost surface 13 to a support structure, not shown, such as an aircraft cockpit roof.

Combiner 16 is shown in FIG. 1 in the deployed position. In use, an image is projected from projection unit 12 through exit lens 14 onto combiner 16, in the direction shown by arrow A. The projection is reflected from combiner 16 in the direction of arrow B, along the line of sight of user 28. The directions of arrows A and B together define a projection plane.

Combiner 16 is partially transparent, so that user 28 will see through combiner 16 the external field of view X overlaid with the image projected from projection unit 12.

When motor 20 is actuated, rotation of gearwheels 22 drives gearwheel 24, which is in turn connected to pivot 18.

Figure 2:
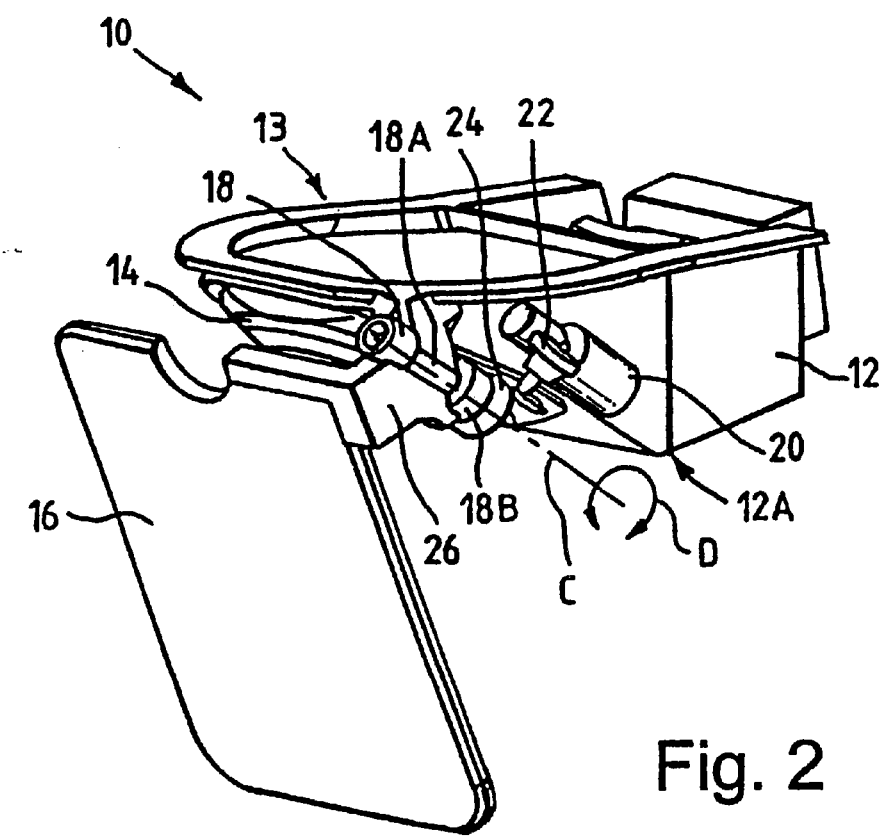
FIG. 2 shows a perspective view of the head up display system of FIG. 1.

Rotation of pivot 18 causes rotation of combiner 16 around pivot axis C in the direction shown by arrow D (FIG. 2). Pivot axis C is located in or parallel to the projection plane defined by arrows A and B, and rotation of combiner 16 in the direction of arrow D is not obstructed by other parts of HUJD system 10.

Referring to FIG. 2, it can be seen that pivot 18 comprises a central rod 18A fixed in its central region to the projection unit 12, with twin rotatable sleeves 1BB surrounding the ends of the rod and fixed to combiner support bracket 26. Gearwheel 24 is fixed to, and rotatably drives, one of the sleeves 18B.

Figure 3:
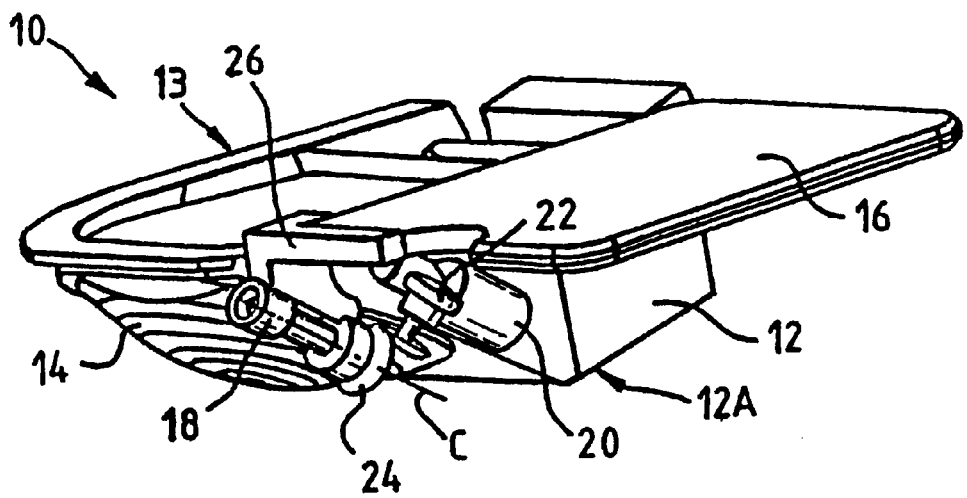
FIGS. 3, 4 and 5 show a perspective view, a side view, and a rear view respectively, of the head up display system of FIG. 1, with the combiner in the stowed position.

FIG. 3 shows a perspective view of head up display system 10 of FIG. 1, after rotation of combiner 16 to the stowed position has been effected. Combiner 16 is here shown offset laterally and vertically from the base of projection unit 12, so that it lies above the level of the lower surface 12A of the projection unit 12.

Figure 4:
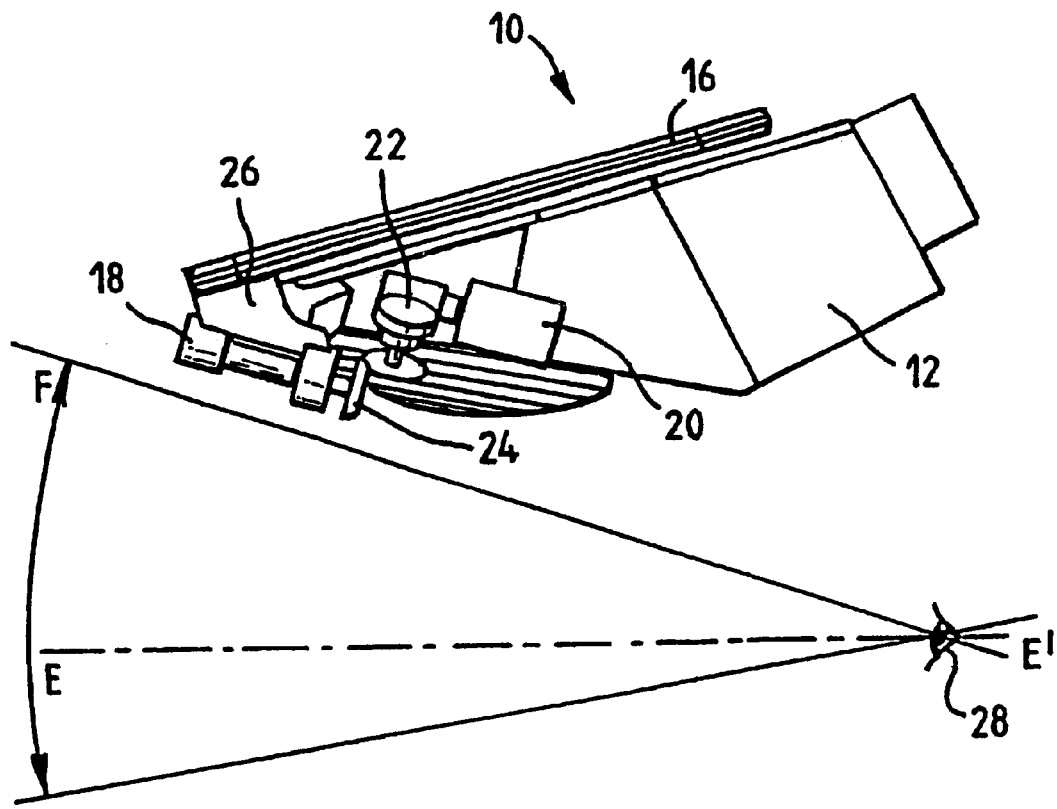

Referring now to FIG. 4, line E–E' shows the direct line of sight of user 28, with arrow F indicating the elevational extent of the unobstructed field of view of user 28 when combiner 16 is in the stowed position.

Figure 5:
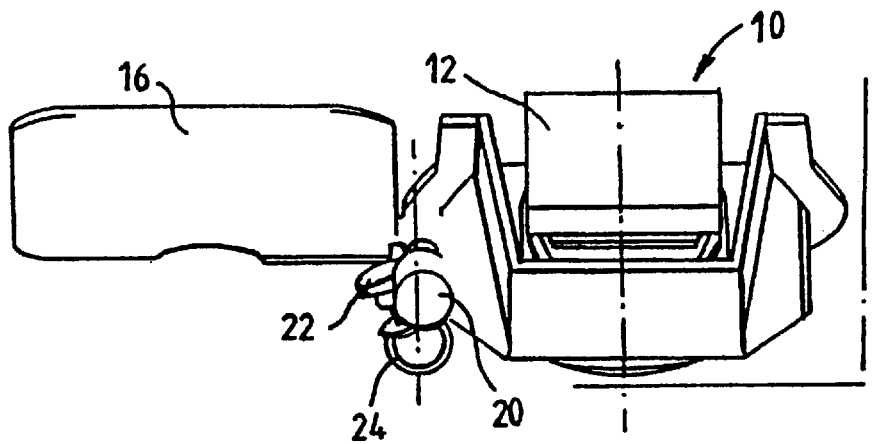

FIG. 5 shows a rear view of head up display system 10, with combiner 16 in the stowed position.

Figure 6:
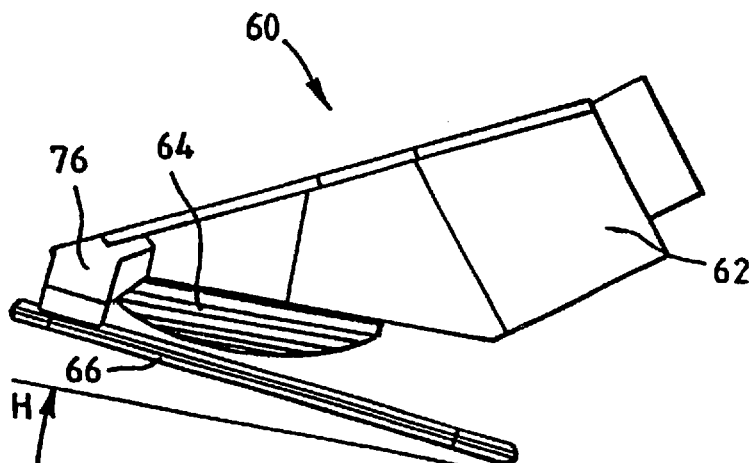
FIGS. 6 and 7 show a side view and a rear view, respectively, of a prior art head up display system, with the combiner in the stowed position.
Figure 7:
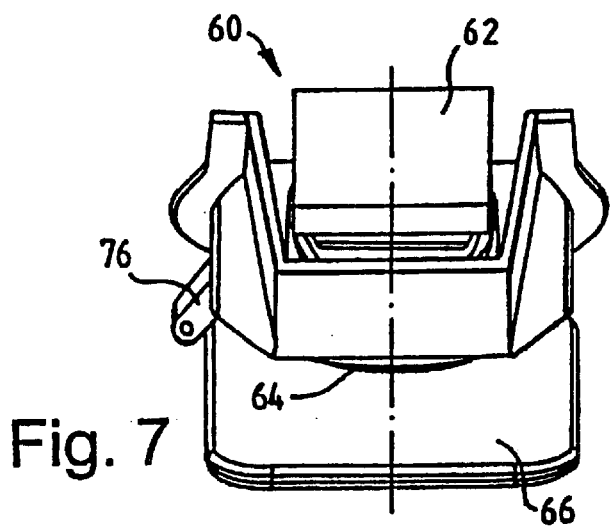

For comparative purposes FIGS. 6 and 7 show a prior art head up display system 60, in side and rear views respectively. Combiner 66 is shown in the stowed position, raised toward exit lens 64 of head up display unit 60, by means of a horizontal transverse pivot (not shown) having an axis extending at right angles to the plane of the paper mounted between projection unit 62 and combiner support bracket 76. Line G–G' shows the direct line of sight of user 78, with arrow H indicating the elevational extent of the unobstructed field of view of user 78 when combiner 66 is in the stowed position.

Comparing FIGS. 6 and 7 with FIGS. 4 and 5, it can be seen that the elevational extent of the unobstructed field of view (arrows F, H) of user 28, 78 extends further above the direct line of sight E–E', G–G' with the head up display system 10 of the present invention compared to the prior art head up display system 60.

It will be apparent to those of skill in the art that numerous modifications and alterations may be made to the head up display unit shown in the figures without departing from the scope of the present invention.

What is claimed is:

1. A head up display system comprising a projection unit and a combiner wherein the projection unit projects an image onto the combiner, when the combiner is located in a deployed position, for reflection of the image towards the eye position of a user, the direction of image projection together with the direction of image reflection generally defining a projection plane;

the combiner being mounted rotatably on the projection unit such that the combiner may be reversibly moved between said deployed position and a stowed position in which said reflection does not occur;

the rotatable mounting taking the form of a pivot having an axis lying substantially in or parallel to the projection plane;

wherein the pivot axis forms an acute angle with the combiner, such that the combiner in the stowed position is laterally offset from the body of the projection unit and is above the level of the lower surface of the projection unit.

2. A head-up display system according to claim 1, wherein the pivot is mounted on one side of the combiner and the projection unit.

3. A head-up display system according to claim 1, wherein the pivot comprises a sleeve surrounding a rod, the rod lying along the axis of rotation of the pivot.

4. A head-up display system according to claim 3, wherein one of said sleeve and rod is fixed in position, and the other of said sleeve and rod is rotatable and fixed to the combiner, such that rotation of said other of sleeve and rod causes rotation of said combiner about the axis of rotation of said pivot.

5. A head-up display system according to claim 1, wherein the head up display system further comprises a motor and gear arrangement to control movement of the combiner between the deployed and stowed positions.

6. A head-up display system according to claim 5, wherein the motor and gear arrangement comprises a gearwheel secured to the pivot, such that rotation of the gearwheel results in rotation of the pivot.

7. A head-up display system according to claim 6, wherein is the gearwheel is further linked to a motor by means of a series of intermediate gear wheels and axles, which transmit movement of the motor to the gearwheel secured to the pivot.

\* \* \* \* \*